(12) United States Patent
Barth et al.

(10) Patent No.: US 7,225,290 B2
(45) Date of Patent: May 29, 2007

(54) ATA AND SATA COMPLIANT CONTROLLER

(75) Inventors: Frank Barth, Radebeul (DE); Henry Drescher, Dresden (DE); Alexander Krebs, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 487 days.

(21) Appl. No.: 10/184,434

(22) Filed: Jun. 27, 2002

(65) Prior Publication Data

US 2003/0191872 A1    Oct. 9, 2003

(30) Foreign Application Priority Data

Apr. 3, 2002    (DE) ................ 102 14 701

(51) Int. Cl.
*G06F 13/00* (2006.01)
(52) U.S. Cl. ............ 710/316; 710/11; 710/38; 710/71; 710/313
(58) Field of Classification Search .......... 710/5, 710/303, 315, 74; 711/5, 131, 202; 709/229; 713/300, 153; 714/7; 375/372
See application file for complete search history.

(56) References Cited

U.S. PATENT DOCUMENTS

| | | | |
|---|---|---|---|
| 5,596,562 A | | 1/1997 | Chen |
| 5,905,885 A | * | 5/1999 | Richter et al. .......... 710/5 |
| 5,949,979 A | | 9/1999 | Snow et al. |
| 6,185,654 B1 | * | 2/2001 | Van Doren ........... 711/5 |
| 6,618,788 B1 | * | 9/2003 | Jacobs ............... 710/315 |
| 6,697,867 B1 | * | 2/2004 | Chong, Jr. ........... 709/229 |
| 6,845,420 B2 | * | 1/2005 | Resnick ............. 710/303 |
| 6,854,045 B2 | * | 2/2005 | Ooi et al. ........... 711/202 |
| 6,898,730 B1 | * | 5/2005 | Hanan .............. 714/7 |
| 6,993,610 B2 | * | 1/2006 | Coffey et al. ........ 710/74 |
| 7,103,128 B2 | * | 9/2006 | Takeuchi et al. ..... 375/372 |
| 7,111,066 B2 | * | 9/2006 | Bellon ............. 709/229 |
| 2002/0087898 A1 | * | 7/2002 | Bormann et al. ..... 713/300 |
| 2003/0005231 A1 | * | 1/2003 | Ooi et al. .......... 711/131 |
| 2003/0131228 A1 | * | 7/2003 | Twomey ............ 713/153 |
| 2005/0251588 A1 | * | 11/2005 | Hoch et al. ......... 710/5 |

OTHER PUBLICATIONS

"Adaptec Announces Serial ATA Controller for Next-Generation Storage Applications", Adaptec Inc., Milpitas, CA, Feb. 22, 2002.

(Continued)

*Primary Examiner*—Christopher E. Lee
(74) *Attorney, Agent, or Firm*—Meyertons Hood Kivlin Kowert & Goetzel, P.C.; B. Noël Kivlin

(57) ABSTRACT

An ATA (Advanced Technology Attachment) controller is provided that comprises at least one parallel port for connecting to at least one ATA compliant storage device, and at least one serial port for connecting to at least one SATA (Serial ATA) compliant storage device. Further, there is a port switching unit provided for switching to at least one of the parallel and serial ports to enable data transfer to and/or from a storage device connected to the port. This enables a software driven reconfiguration making it possible to switch between a mode where the controller behaves like a conventional ATA controller, and a mode where the controller behaves like a conventional SATA controller. A significant amount of hardware may be reused.

31 Claims, 2 Drawing Sheets

OTHER PUBLICATIONS

"Intel 82801 BA I/O Controller Hub (ICH) Datasheet and Intel 82801 BAM I/O Controller Hub Mobile (ICH2 M)", Intel, Oct. 2000, pp. iii and V, chapter 1.2 Overview: pp. 1-3 to 1-8.

"Silicon Image Debuts SATALink™ Family of End-to-End Serial ATA Solutions", Intel Developer Forum, San Francisco, CA, Feb. 25, 2002.

* cited by examiner

ATA AND SATA COMPLIANT CONTROLLER

BACKGROUND OF THE INVENTION

1. Field of the Invention

The invention generally relates to controlling data transfer to and/or from storage devices, and relates in particular to ATA (Advanced Technology Attachment) controllers.

2. Description of the Related Art

In computer systems, hard disks and other drives such as CD or DVD drives, tape devices, high capacity removeable devices, zip drives, and CDRW drives are storage devices that may be connected to the computer via an interface for defining the physical and logically requirements for performing data transfer to and from the devices. One of the most popular interfaces used in modem computer systems is the one most commonly known as IDE (Integrated Drive Electronics). The IDE drive interface, more properly called AT (Advanced Technology) Attachment (ATA) interface, was developed starting in 1986 and was standardized around 1988. The specification which provides a way to make disk drive "attachments" to the PC (Personal Computer) architecture, was further developed to a variety of more recent specifications such as ATA/ATAPI, EIDE, ATA-2, Fast ATA, ATA-3, Ultra ATA, Ultra DMA, ATA-4 and many more as well. All of these specifications define storage interfaces for connecting to parallel storage devices and are referred to as being ATA compliant hereafter.

While the parallel ATA interconnect has been the dominant internal storage interconnect for desktop and mobile computers because of its relative simplicity, high performance, and low cost, ATA compliant interfaces have a number of limitations that are exhausting their ability to continue increasing performance. Some of these limitations are the 5-volt signalling requirement, and the high pin count. These and other characteristics of parallel ATA interfaces are the reasons why such interfaces cannot scale to support several more speed doublings as happened in the past, so that this interface is nearing its performance capacity.

For this reason, and to provide scaleable performance for the next decade, serial ATA (SATA) was developed as a next generation ATA specification. SATA is an evolutionary replacement for the parallel ATA physical storage interface and is designed to be 100% software compatible with today's ATA, but to have a much lower pin count, enabling thinner, more flexible cables. Because of the maintained software compatibility, no changes in today's drivers and operating systems are required. Moreover, the lower pin count also benefits the system design of motherboards and their chipsets and other integrated silicon components.

As mentioned above, one of the key features of the SATA interface is the software compatibility to parallel ATA controllers. This can be better understood from a comparison of FIGS. 1 and 2 which illustrate standard ATA and the serial ATA (SATA) connectivity, respectively.

Turning first to FIG. 1 which depicts how ATA compliant parallel storage devices are connected to a computer system to enable data transfer to and from the devices, the computer system includes an operating system 115 that is the main software running on the computer. There may further be multiple application programs 100, 105, 110 which usually have a user interface for providing information to the user and receiving input. Of course, application programs with no user interface exist as well. Further, there is usually a driver software 120 provided which may be an extra software component, or part of the operating system 115, and which is run specifically to interact with ATA compliant hardware.

This hardware includes the ATA adapter 125 which exchanges data signals with devices 135, 140 over a parallel port 130. The ATA adapter 125 is also called ATA controller, often together with the parallel port 130.

Referring now to FIG. 2 which illustrates the corresponding parts of a computer system having an SATA interface, there are no changes required in the application programs 100, 105, 110, the operating system 115, nor the driver 120. On the hardware side, an SATA adapter 200 is provided that is connected to one or more serial ports 210, 215 for exchanging signals with serial devices 220, 225. That is, the SATA enabled computer system differs from the system of FIG. 1 in that the devices and ports are serialized, and an appropriate SATA compliant adapter 200 is provided. Focusing in more detail to this adapter, it can be seen, that the SATA adapter 200 may be understood as comprising an ATA adapter 125, being accompanied with a parallel/serial converter 205 to perform parallel-to-serial and serial-to-parallel conversion of data signals.

As neither in the operating system 115 nor in the driver software 120 specific adaptations to the SATA specification are required, the interface of FIG. 2 is software compatible with the technique of FIG. 1. Thus, SATA is a drop-in solution, and today's software will run on the new architecture without modification. Given this feature and the above described other advantages, and further taking into account that SATA compliant controllers and devices will be of about the same costs as conventional units, SATA is expected to eventually completely replace parallel ATA interfaces. SATA's adoption by the industry will follow a phased transition path, and there will be a point where both parallel and serial ATA capabilities are available.

Although the technology is software compatible and operating system transparent, SATA electronics and connectors will differ from those of the conventional ATA interface. For this reason, adapters may be provided to facilitate forward and backward compatibility of hard disks and other storage devices on computer systems. For instance, SATA-to-ATA bridges may be used in hard disk drives and storage systems, and ATA-to-SATA bridges may be used in motherboards, add-in cards and drive test equipment. However, such conventional solutions require a significant amount of additional hardware components and thus lead to increased manufacturing costs.

SUMMARY OF THE INVENTION

An improved controller and controlling method is provided that may allow reusing most of the hardware of conventional ATA compliant controllers for implementing SATA capabilities in a cost effective manner.

In one embodiment, an ATA controller is provided that comprises at least one parallel port for connecting to at least one ATA compliant storage device, and at least one serial port for connecting to at least one SATA compliant storage device. The ATA controller further comprises a port switch unit for switching to at least one of the parallel and serial ports to enable data transfer to and/or from a storage device that is connected to the port.

In another embodiment, an integrated circuit chip comprising circuitry for performing data transfer to and/from ATA and SATA compliant devices is provided. The integrated circuit chip comprises a register storing identification data indicating at least one ATA or SATA compliant device connected to a parallel or serial port, respectively. The integrated circuit chip further comprises switching circuitry for switching to at least one ATA or SATA compliant device indicated by the stored identification data.

In a further embodiment, there may be provided a method of operating an ATA controller. The method comprises storing identification data in a port map register of the ATA controller, wherein the identification data indicates at least one ATA or SATA compliant storage device connected to a parallel port or serial port, respectively. The method further comprises reading out the stored identification data, switching to the port connected to the storage device indicated by the read out identification data, and performing data transfer to and/or from the storage device indicated by the read out identification data.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
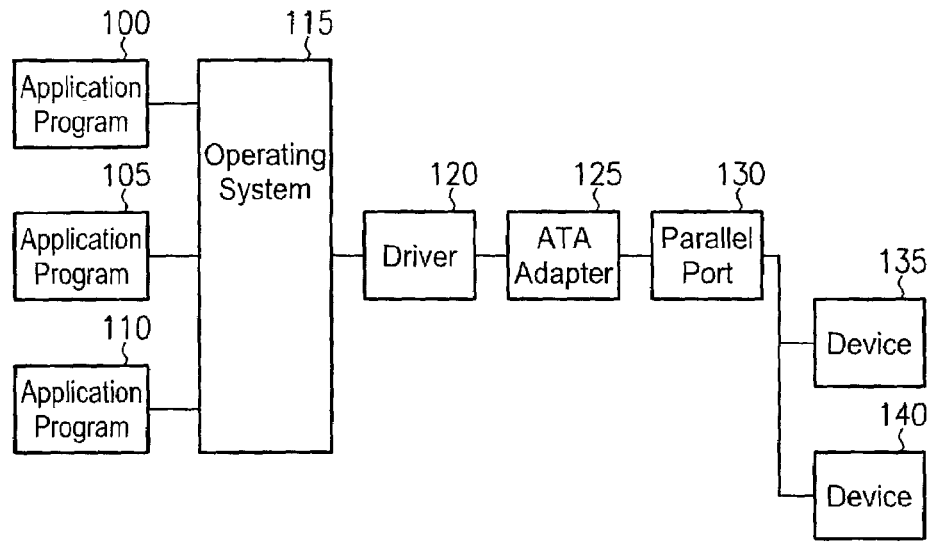
FIG. 1 illustrates a conventional computer system that is connected to ATA compliant storage devices.
Figure 2:
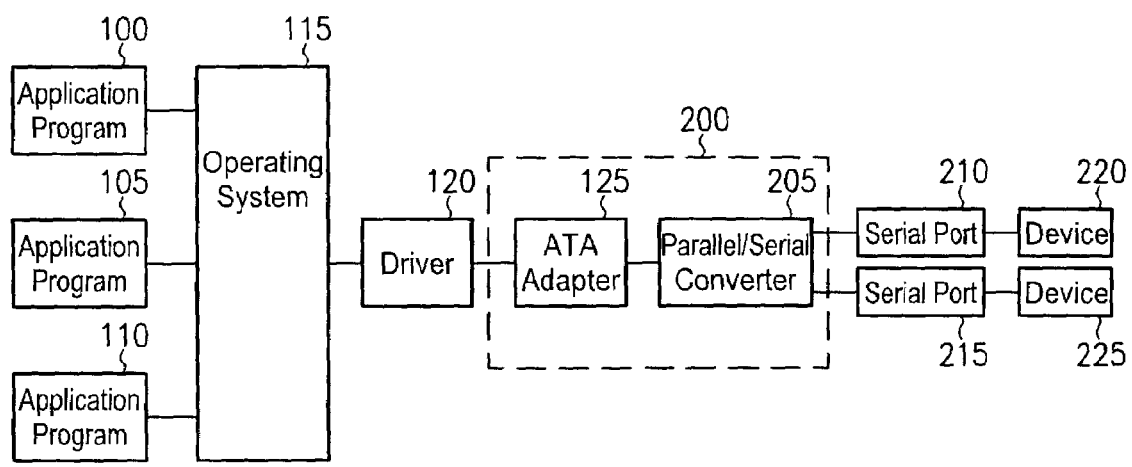
FIG. 2 illustrates a conventional computer system that is connected to SATA compliant storage devices.
Figure 3:
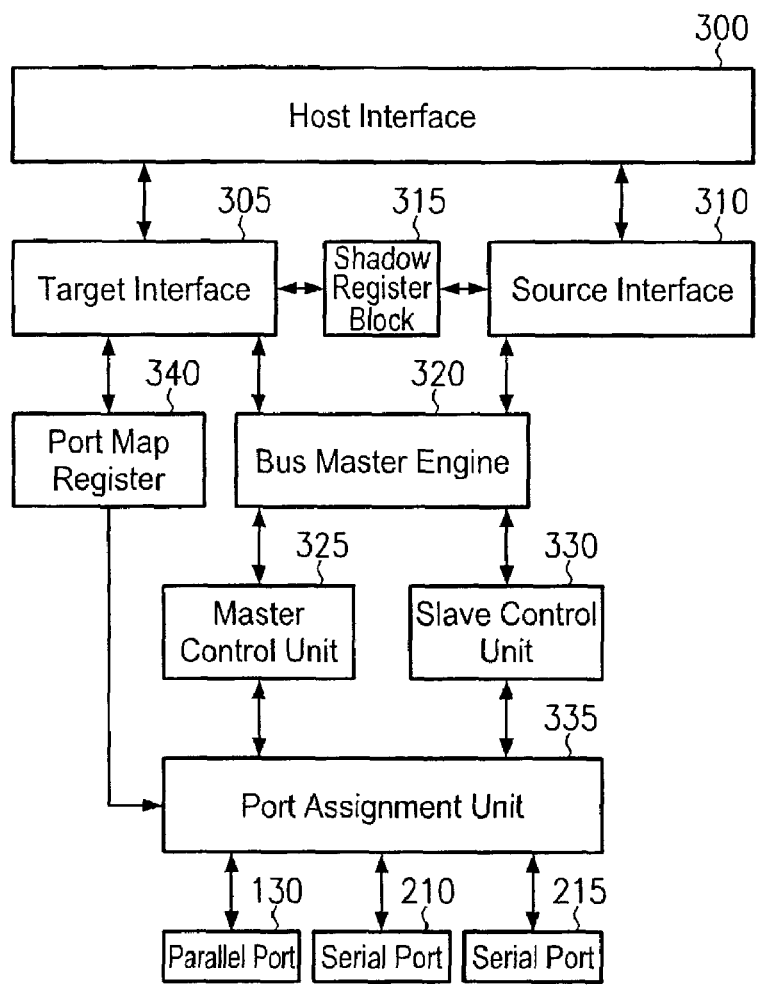
FIG. 3 illustrates the components of an ATA controller according to an embodiment.

Referring now to the drawings and particularly to FIG. 3 which illustrates the hardware components of an ATA controller according to an embodiment, the controller comprises a target interface unit 305 and a source interface unit 310. Both interfaces are connected to the host interface 300 for exchanging requests and data with the software driver 120. The target interface 305 may be used by the driver 120 for accessing the controller for configuration purposes. On the other hand, the source interface 310 may be used to perform data access to read or write data to/from the storage devices.

There is further provided a bus master engine 320 for controlling which one of the master control unit 325 and the slave control unit 330 is granted access to which one of the target interface 305 and the source interface 310, and vice versa. The master control unit 325 and the slave control unit 330 may be built up like in conventional ATA controllers 125 that control a parallel port to which two parallel devices can be connected, one being the master and the other being the slave.

Further, there is a shadow register block 315 provided that includes interface registers used for delivering commands to the devices or posting status from the devices. The shadow register block 315 is so named since it contains a set of registers that shadow the contents of the traditional device registers, for performing standard ATA emulation. In the present embodiment, the controller operates in the master/slave emulation mode specified in the SATA specification, that is, two serial devices on two separate serial ports 210, 215 are represented to host software as a master and a slave accessed at the same set of host bus addresses.

To realize this functionality, there may be provided a port assignment unit 335 which may be used for switching between the parallel and serial ports 130, 210, 215. The port assignment unit 335 further connects the master and slave devices connected to the parallel port 130 to the correct control unit 325, 330. Also, the serial devices connected to the serial ports 210, 215 are connected to either the master control unit 325 or the slave control unit 330, as the controller of the present embodiment operates in the master/slave emulation mode as described above. Another function performed by the port assignment unit 335 is that of the parallel/serial converter 205, i.e., it performs a conversion of parallel to serial data signals and vice versa.

As can be seen from FIG. 3, the port assignment unit 335 receives further input from port map register 340. The port map register 340 which may actually be a set of registers, stores port identification data indicating which one of the parallel and serial ports 130, 210, 215 is activated. It is to be noted, that generally any number of ports may be activated, including the case where no port is active, or where all of the parallel and serial ports are activated.

In another embodiment, the port map register 340 and the port assignment unit 335 may be such that the ATA controller of FIG. 3 can operate in one of the following configurations. In the first configuration, either zero, one or two parallel ATA devices can be driven. In another configuration, either zero, one or two serial ATA devices can be driven. Finally, in a third configuration, one parallel and one serial device can be driven.

It is to be noted that the port map register 340 that stores port identification data defining the ports to be used, or the configuration, is connected to the target interface 305 so that the driver 120 has access to the register(s) to perform a reconfiguration. That is, the embodiment extends an existing parallel ATA controller by a serial port and thus allows reusing a significant amount of parallel ATA controller hardware for implementing a cost effective software configurable combined serial/parallel ATA controller.

The entire controller can be reconfigured to operate as conventional ATA controller, or to operate as conventional SATA controller. That is, a software driven reconfiguration is provided that makes it possible to switch between a mode where the controller behaves like a conventional ATA controller, and a mode where the controller behaves like a conventional SATA controller. Additionally, the controller according to the embodiment can be configured to concurrently perform data transfer to parallel and serial devices. That is, the controller of the embodiment is a chameleon device which adjust to any possible connectivity modes simply by performing a software reconfiguration.

Moreover, in one of the modes, parallel and serial devices can even be operated simultaneously. It is to be noted that the concurrent data transfer to and from a parallel and serial storage devices may be done by expanding the SATA transport layer state machine to be able to use conventional ATA control signals generated by conventional ATA interface control circuits, and to add an additional payload buffer.

As discussed above, the port map register 340 allows the software 100, 105, 110, 115, 120 to configure and reconfigure the arrangement. This includes the configuration of the master or the slave or both devices to either a parallel or a serial device. Moreover, as defined in the SATA specification, the controller may have the registers required to allow read/write processes to the SATA port status and error registers.

Figure 4:
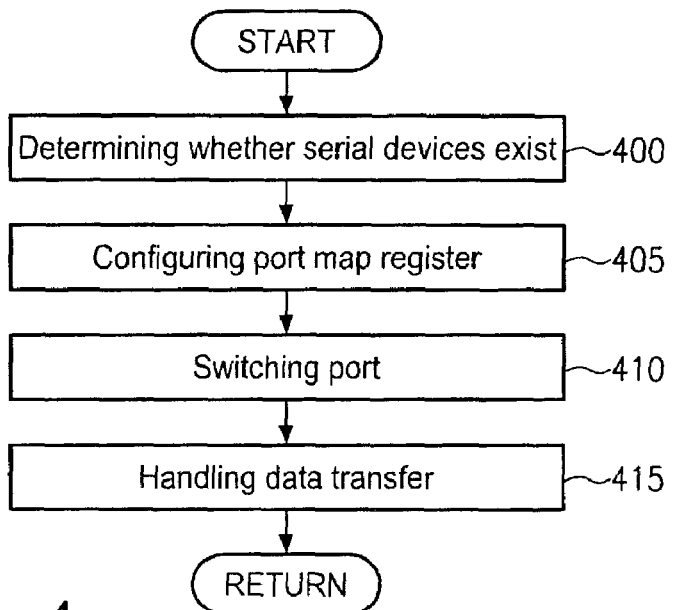
FIG. 4 is a flowchart illustrating the process of operating the ATA controller of FIG. 3.

Turning now to FIG. 4, a flowchart is shown illustrating the process of operating the ATA controller according to the embodiment of FIG. 3. In step 400, the software checks if there are serial ATA drives plugged in, e.g. by reading the SATA port status register. The software then configures the port map register 340 in step 405. It is to be noted that steps 400 and 405 may be performed during initialization of the controller.

In response to an action from driver 120, or in response to a request from one of the storage devices, the port assignment unit 335 may act as port switch unit to switch to the appropriate ports 130, 210, 215 in step 410. If a correct port is already active, this step may be skipped. Once access to the storage device is made possible, the data transfer is performed in step 415.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An ATA (Advanced Technology Attachment) controller comprising:
   at least one parallel port for connecting to at least one ATA compliant storage device;
   at least one serial port for connecting to at least one SATA (Serial ATA) compliant storage device; and
   a port switch unit configured to switch to at least one of said parallel and serial ports to enable data transfer to and/or from a storage device connected to said port, and further configured to switch between said at least one parallel port and at least one serial port.

2. The ATA controller of claim 1, further comprising:
   at least one port map register storing port identification data identifying at least one of the parallel and serial ports to be used for performing data transfer to and/or from a storage device connected to said port;
   wherein said port switch unit is arranged for switching to the port indicated by the data stored in said at least one port map register.

3. The ATA controller of claim 2, wherein said at least one port map register is connected to store said port identification data in response to software requests.

4. The ATA controller of claim 2, wherein each of said at least one parallel ports is arranged for connecting to two ATA compliant storage devices, and said at least one port map register further stores master/slave identification data indicating which one of the two ATA compliant storage devices connected to a parallel port identified by said port identification data is used for data transfer.

5. The ATA controller of claim 4, wherein said at least one port map register is connected to store, said port identification data and said master/slave identification data in response to software requests.

6. The ATA controller of claim 1, comprising two serial ports each for connecting to one SATA compliant storage device, and further comprising:
   a control unit for controlling data transfer to and/or from the SATA compliant storage devices in a master/slave emulation mode wherein one of the SATA compliant storage devices is represented to host software as master and the other SATA compliant storage device as slave, both being accessible at the same set of host bus addresses.

7. The ATA controller of claim 1, comprising one parallel port for connecting to two ATA compliant storage devices, and two serial ports each for connecting to one SATA compliant storage device, and further comprising a port map register storing port identification data identifying at least one of the parallel and serial ports to be used for performing data transfer.

8. The ATA controller of claim 7, wherein said port map register is arranged to store data indicating that only ATA compliant storage devices and no SATA compliant storage device are used for data transfer.

9. The ATA controller of claim 7, wherein said port map register is arranged to store data indicating that only SATA compliant storage devices and no ATA compliant storage device are used for data transfer.

10. The ATA controller of claim 7, wherein said port map register is arranged to Store data indicating that both an ATA compliant storage device and an SATA compliant storage device are used for data transfer.

11. The ATA controller of claim 1, arranged for determining if an SATA compliant storage device is connected to at least one serial port.

12. The ATA controller of claim 11, arranged for providing information on the determined SATA compliant storage device to host software.

13. The ATA controller of claim 11, wherein said port switch unit is arranged for automatically switching, in an initialization mode of the ATA controller, to the determined SATA compliant storage device.

14. The ATA controller of claim 1, wherein said port switch unit is arranged for converting parallel data to serial data and/or serial data to parallel data to enable data transfer to and/or from SATA compliant storage devices.

15. The ATA controller of claim 1, being an integrated circuit chip.

16. An integrated circuit chip comprising circuitry for performing data transfer to and/or from ATA (Advanced Technology Attachment) and SATA (Serial ATA) compliant devices, comprising:
   a register storing identification data indicating at least one ATA or SATA compliant device connected to a parallel or serial port of an ATA controller, respectively, the ATA controller including both the parallel port and the serial port; and
   switching circuitry configured to switch to the at least one ATA or SATA compliant device indicated by the stored identification data and further configured to switch between the parallel port and the serial port.

17. A method of operating an ATA (Advanced Technology Attachment) controller, the method comprising:
   storing identification data in a port map register of the ATA controller, indicating at least one ATA or SATA (Serial ATA) compliant storage device connected to a parallel port or a serial port of the ATA controller, respectively, wherein the ATA controller includes both the parallel port and the serial port;
   reading out the stored identification data;

switching to the port connected to the storage device indicated by the read out identification data, wherein said switching includes switching between the serial port and the parallel port; and performing data transfer to and!or from the storage device indicated by the read out identification data.

18. The method of claim 17, further comprising:
receiving a software request to store said identification data into said port map register.

19. The method of claim 17, wherein said parallel port is arranged for connecting to two ATA compliant storage devices, and said identification data includes master/slave identification data indicating which one of the two ATA compliant storage devices connected to said parallel port is used for data transfer.

20. The method of claim 19, further comprising:
receiving a software request to store said master/slave identification data into said port map register.

21. The method of claim 17, wherein said ATA controller comprises two serial ports each for connecting to one SATA compliant storage device, and the step of performing data transfer further comprises:
operating said ATA controller in a master/slave emulation mode wherein one of the SATA compliant storage devices is represented to host software as master and the other SATA compliant storage device as slave, both being accessible at the same set of host bus addresses.

22. The method of claim 17, arranged for operating an ATA controller comprising one parallel port for connecting to two ATA compliant storage devices, and two serial ports each for connecting to one SATA compliant storage device.

23. The method of claim 22, wherein said storing step is arranged for storing identification data indicating that only ATA compliant storage devices and no SATA compliant storage device are used for data transfer.

24. The method of claim 22, wherein said storing step is arranged for storing identification data indicating that only SATA compliant storage devices and no ATA compliant storage device are used for data transfer.

25. The method of claim 22, wherein said storing step is arranged for storing identification data indicating that both an ATA compliant storage device and an SATA compliant storage device are used for data transfer.

26. The method of claim 17, further comprising:
determining if an SATA compliant storage device is connected to a serial port.

27. The method of claim 26, further comprising:
providing information on the determined SATA compliant storage device to host software.

28. The method of claim 26, wherein said storing step is arranged for storing identification data identifying the determined SATA compliant storage device.

29. The method of claim 17, wherein said step of performing data transfer comprises:
converting parallel data to serial data and/or serial data to parallel data to enable data transfer to and/or from SATA compliant storage devices.

30. An ATA (Advanced Technology Attachment) controller comprising:
at least one parallel port for connecting to at least one parallel port device;
at least one serial port for connecting to at least one serial port device; and
a port switch unit for switching to at least one of said parallel and serial ports to enable data transfer to and/or from a device connected to said port and further configured to switch between said at least one parallel port and said at least one serial port.

31. A method of operating an ATA (Advanced Technology Attachment) controller, the method comprising:
storing identification data in a port map register of the ATA controller, indicating
at least one parallel or serial port device connected to a parallel port or a serial port of the ATA controller, respectively, wherein the ATA controller includes both the parallel port and the serial port;
reading out the stored identification data;
switching to the port connected to the device indicated by the read out identification data, wherein said switching includes switching between the parallel port and the serial port; and
performing data transfer to and/or from the device indicated by the read out identification data.

* * * * *